United States Patent [19]
Braudy

[11] 3,745,586
[45] July 10, 1973

[54] LASER WRITING

[75] Inventor: Robert S. Braudy, Audubon, N.J.

[73] Assignee: RCA Corporation, New York, N.Y.

[22] Filed: July 1, 1971

[21] Appl. No.: 158,989

Related U.S. Application Data

[63] Continuation of Ser. No. 779,865, Nov. 29, 1968, abandoned.

[52] U.S. Cl.................... 346/76, 117/37, 117/93.3, 101/471, 117/106 R
[51] Int. Cl. .......................................... G01d 15/10
[58] Field of Search.................... 117/36.1, 37, 93.3, 117/106 R; 346/76; 101/467, 470; 118/640, 641

[56] References Cited

UNITED STATES PATENTS

| 3,465,347 | 9/1969 | Hudson | 346/1 |
| 1,934,753 | 11/1933 | Wildhaber | 346/76 X |
| 3,474,457 | 10/1969 | Becker | 346/76 |

OTHER PUBLICATIONS

Woodward, IBM Technical Disclosure Bull., Vol. 9, No. 11, Apr. 1967, p. 1592.

*Primary Examiner*—Ralph S. Kendall
*Attorney*—Edward J. Norton

[57] ABSTRACT

Laser energy is used to selectively irradiate the uncoated surface of a thin film element, coated on one surface with an ink-like coating, to cause the selective transfer of the coating to an adjacently spaced material.

4 Claims, 1 Drawing Figure

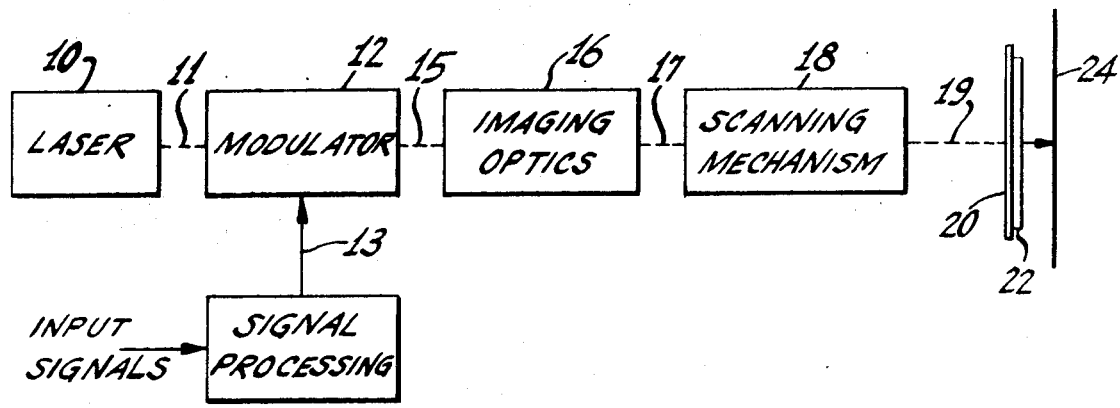

LASER WRITING

This application is a continuation of application Ser. No. 779,865, filed Nov. 29, 1968, now abandoned.

This invention relates to image transfer techniques and apparatus therefore, and, more particularly, to non-impact writing via the transference of an ink-like substance from one surface to another using laser radiation.

Due to its coherence, the laser shows prospects of becoming a basic tool in the field of information transmission. As an energy source it is compatible with intensity modulator requirements. Furthermore, electro-optical/mechanical deflection of laser radiation can be accomplished, with good positioning, at extremely high rates of speed.

It has been found possible, via the selective application of laser radiation, to create an image on a material adapted to receive the same. Basically, this is accomplished by positioning the material to receive the image a slight distance away from the coated surface of a thin film carrier; the coating being a transferable ink-like substance. When the uncoated surface of the carrier is irradiated with laser radiation, the portion of the coating opposite the irradiated area is transferred from the carrier to the receiving material.

Accordingly, it is an object of the present invention to provide method and apparatus for transferring an ink-like substance from one surface to another, over a spaced interval, using laser radiation.

A method for transferring an ink-like substance from one surface to another, over a spaced interval, using laser radiation, in accordance with one embodiment, comprises selectively irradiating one surface of a thin film element with laser energy, the opposite surface of said thin film element carrying a transferable coating thereon, to cause the selective transfer of said coating, from said film to an adjacently spaced material adapted to receive the transferred portions of said coating.

Image transfer apparatus comprises a thin film element having a transferable coating on one surface thereof, said surface spaced adjacent to material adapted to receive the transferred image; means for providing a beam of laser light, said light beam characterized by a predetermined wavelength, and, means for selectively irradiating the opposite surface of said film with said beam, said impinging beam coacting with said coated film to result in the transferal of said coating, from said film to said adjacently spaced material.

The present invention, as well as additional objects and advantages thereof, will be best understood upon reading the following description in conjunction with the accompanying drawing. Some recent publications which may be referred to for background include:

Roshon, D.D., and Young, T., "Printing By Means of a Laser Beam," IBM Technical Disclosure Bulletin, Vol. 7, No. 3, August 1964;

Roshon, D.D., and Young, T., "Display Device Using Laser Beams," IMB Technical Disclosure Bulletin, Vol. 7, No. 3, August 1964;

Potts, H.R., and Speicher, C.A., "Laser Induced Evaporation," IMB Technical Disclosure Bulletin, Vol. 8, No. 2, July 1965;

Woodward, D.H., "Distillation Printing," IBM Technical Disclosure Bulletin, Vol. 9, No. 11, April 1967; and Holmstrom, F., and Nepela, D.A., "Deformation Recording Method," IBM Technical Disclosure Bulletin, Vol. 10, No. 6, November 1967.

Turning now to a brief description of the figure which is illustrative of the present invention, the light modulator 12 accepts the laser beam 11 emitted by the laser 10 and modulates its intensity in response to the input signal 13. The modulator 12 may be of the type which uses electro-optic crystals to affect the polarization of the laser beam as a direct function of the applied signal voltage. Polarization modulation might then be converted into intensity modulation by a polarization analyzer attached to the modulator. Beam-enlargement and spot-forming optics, i.e. the imaging optics 16, then increases the diameter of the intensity modulated laser beam 15 until it fills the desired aperature of the imaging lens. The convergent cone of light 17 leaving the imaging lens may than be intercepted by a scanning mirror incorporated within the scanning mechanism 18. Scanning may be accomplished by rotating a multi-faced mirror in precision air bearings with a direct-drive servo motor. Thus, the converging cone of light 19, directed by the scanning mechanism 18, would repetitively swing through an arc to produce an active scan on the uncoated surface 20 of a thin film substrate; the opposite surface of the substrate being coated with an ink-like substance 22. Spaced adjacent to the coated surface 22 of the substrate would be a material 24 adapted to receive the transferred image created. As the uncoated surface 22 of the carrier is selectively irradiated by the intensity modulated beam 19, via the scanning mechanism 18, the coating opposite the irradiated are is transferred from the substrate to the adjacent spaced material 24. A more thorough understanding of the general mechanics of transference will be derived upon reading the following articles, i.e.:

Ready, J. F., "Effects Due to Absorption of Laser Radiation," Journal of Applied Physics, Vol. 36, No. 2, February 1965; and Ready, J.F., Bernal, E.G., and Sheperd, L.T., "Mechanisms of Laser-Surface Interactions," Honeywell Corporate Research Center, November 1967.

The work performed by Ready et al., as documented in the foregoing references, indicates that the direction of the target material caused to be ejected by the incident laser radiation is normal to the surface of the target. Specifically, in the plane defined by the normal to the target surface and the laser beam, the emitted material is concentrated within an angular spread of about 15 degrees to the target normal. Experimentation has shown that no noticeable angular spread of the transmitted material occurred over an air gap of approximately 4–5 mils.

A further and distinct advantage of the previously described embodiment resides in the ability to establish a virtual gray scale in the image accepting material by utilizing an intensity modulated beam. Experimentation by others in the metallurgical arts, directed to the formation of apertures in metal solids, has verified that beyond a critical energy density, which is material dependent, the mass of material transferred from an irradiated target is proportional to the energy density of the impinging beam. See:

Anisimov, S.L., Bonch-Bruevich, A.M., El'yashevich, M.A., Imas, Ya.A., Pavlenko, N.A., and Romanov, G.S., "Effect of Powerful Lights Fluxes on Metals," Soviet Physics – Technical Physics, Vol. 11, No. 7, January 1967;

Braginskii, V.B., Minakova, I.I., and Rudenko, V.N., "Mechanical Effects in the Interaction Between Pulsed Electro-magnetic Radiation and a Metal," Soviet Physics – Technical Physics, Vol. 12, No. 6, December 1967; and Ready, J.F., "Effects Due to Absorption of Laser Radiation," Ibid.

In actual experiments carrier substrates of mylar, polyethelene, and nylon, coated with inks of various colors, e.g. red, blue, purple, black, were used with success to transmit onto the accepting material, over a gap of from four to five mils. More specifically, a carbon black based ink coated on a one mil polyethelene typewriter ribbon was transferred using 4880°A laser radiation at power densities of from 10–100 kilowatts per square centimeter.

Since non-impact electro-optical/mechanical deflection of radiation lends itself to high speed operation it can readily be applied to high speed data printout applications for use with computors or as a teletype. In the case of the latter a further advantage is derived since the non-impact property permits the writing to be silent.

Furthermore, since neither the coated carrier nor the material to receive the image need be special in nature, they do not require special handling; i.e. ambient light or moisture will generally not adversely affect the operation. In addition the written page does not require any further processing and therefore can be read immediately. The technique can be used to form alphanumeric arrays as well as picture images.

Additional applications to which the forementioned techniques may be applied include the direct formation of lithographic type printing plates as well as the production of masks for integrated circuit devices and the like.

In the case of printing plates the carrier could be coated on one surface with an ink-accepting material which would be spaced adjacent to a material suited for use as a printing plate. The coating could be any of a number of printers lithographic inks which are available in a variety of colors. The uncoated surface of the carrier would then be irradiated to cause the ink accepting coating to be selectively transferred from the carrier to the adjacently spaced base material. The plate could then directly be used within lithographic process, thereby obviating the time consuming and costly process of developing film from photocopy to produce the plate and/or the setting of type.

In the case of the integrated circuit masks the carrier could be coated with a photoresist type of material which would then be selectively transferrred to the base material of the mask. The mask could then be formed using conventional photo-etching techniques. A great advantage of this technique resides in the fact that the deposition of the resist can be achieved very accurately thereby significantly decreasing the margin of error associated with photographic reduction/enlargement procedures.

What is claimed is:

1. Apparatus for establishing a virtual grey scale representation of information, comprising:
   a carrier member having a transferable coating on one surface thereof, said carrier member being capable of absorbing radiation of a predetermined wavelength;
   a material adjacent but spaced from said coated surface of the carrier member, said material adapted to receive said transferable coating;
   means for providing a beam of light, said light beam including said predetermined wavelength;
   means for modulating said beam in response to an applied control signal to thereby control the energy density of said beam; and
   means for selectively irradiating with said modulated beam the uncoated surface of said carrier member, to vaporize by energy absorption a variable amount of the coating on the opposite surface of the member and to cause said variable amount of said coating to be transferred in coherent manner across said space to said material, in accordance with said applied control signal.

2. The invention according to claim 1, wherein said coating on said carrier member is an ink like substance with the transference of said substance to said material forming thereby an immedaitely visible viable image on said material.

3. The invention according to claim 1, and further including means for focusing said light beam at the surface of said carrier member.

4. Image transfer apparatus, comprising:
   a carrier substrate having a vaporizable coating on one surface thereof, said carrier being capable of absorbing laser energy of a given wavelength directed thereupon without destruction of said substrate,
   a material adapted to receive the transferred image separated from said coated surface by a gap,
   means for providing a beam of laser light, said light beam characterized by said given wavelength;
   means for intensity modulating said beam, in response to an applied control signal, to provide a beam of continuously varying energy density;
   means for selectively irradiating the uncoated surface of said substrate with said modulated beam, said modulated beam coacting with said substrate to cause said coating to be vaporized and projected in coherent manner across said gap to said material,
   the mass of the coating material transferred being variable in accordance with the varying energy density of the impinging beam.

* * * * *